US006385419B1

United States Patent
Genovese

(10) Patent No.: US 6,385,419 B1
(45) Date of Patent: May 7, 2002

(54) PHOTORECEPTOR BELT DRIVE SYSTEM

(75) Inventor: Frank C. Genovese, Fairport, NY (US)

(73) Assignee: Xerox Corporation, Rochester, NY (US)

(*) Notice: Subject to any disclaimer, the term of this patent is extended or adjusted under 35 U.S.C. 154(b) by 0 days.

(21) Appl. No.: 09/730,293

(22) Filed: Dec. 5, 2000

(51) Int. Cl.[7] .................. G03G 15/00; B65G 39/16
(52) U.S. Cl. .................. 399/167; 198/807; 399/165; 399/303
(58) Field of Search .................. 399/162, 165, 399/167, 299, 303, 395; 198/806, 807, 810.03; 474/102, 111

(56) References Cited

U.S. PATENT DOCUMENTS

| 3,913,729 A | * 10/1975 | Andrews | 198/807 |
| 4,174,171 A | * 11/1979 | Hamaker et al. | 399/165 |
| 4,519,700 A | 5/1985 | Barker et al. | 399/394 |
| 5,394,222 A | 2/1995 | Genovese | 399/167 |
| 5,418,600 A | 5/1995 | Genovese | 399/167 |
| 5,737,003 A | * 4/1998 | Moe et al. | 347/116 |
| 6,134,406 A | * 10/2000 | Moe et al. | 399/165 |
| 6,195,518 B1 | * 2/2001 | Bennett et al. | 399/165 |

FOREIGN PATENT DOCUMENTS

EP 0923002 A1 * 6/1999

* cited by examiner

Primary Examiner—Sophia S. Chen
(74) Attorney, Agent, or Firm—Perman & Green, LLP

(57) ABSTRACT

A transport system for transporting sheet media in an image transport apparatus. The transport system comprises a drive section, and at least one wheel drivingly connected to the drive section. The wheel is disposed to contact the sheet media for transporting the sheet media generally in a process direction in the image transport apparatus, when the wheel is driven by the drive section. The wheel is steerable. The wheel is steered for orienting the wheel in a predetermined direction and for controlling a direction of travel of the sheet media relative to the process direction.

28 Claims, 7 Drawing Sheets

PHOTORECEPTOR BELT DRIVE SYSTEM

BACKGROUND OF THE INVENTION

1. Field of the Invention

The present invention relates to a photoreceptor belt drive system for an image transfer apparatus and, more particularly, to a photoreceptor belt drive system with steerable capstans.

2. Prior Art

Conventional electro photographic image transfer apparatus, such as printer, include a photoreceptor member and a drive or transport system for transporting the photoreceptor member through various processing stations in order to generate an image on the photoreceptor member. The transport system controls the speed of the photoreceptor member as it moves through the multiple processing stations of the electro-photographic printer so that all image bearing sections on the photoreceptor are correctly orchestrated with the various processing stations, and each station processes an appropriate section of the photoreceptor. For example, in color printers where multiple latent images are separately developed on the photoreceptor member using different color toners and are then transferred to a common surface, the quality of the final image is dependent on how accurately each of the latent images is placed or registered on the photoreceptor. As is well known, when separate color images are superimposed to form a full-color image, slight misregistration of the individual colors may cause undesirable features to appear that render the final output unacceptable to a user. Registration problems may manifest themselves through image defects. For example, color fringes surrounding sharp edges within the image proper, or "moire fringes" or "banding" result in visible spatial interference patterns distributed throughout the image. Precise placement of pixels of the latent images on the photoreceptor member, both in a process direction within the apparatus, and in a direction transverse (i.e. lateral, or cross-process direction) to the process direction aids in avoiding these defects in the output image. The accuracy of the placement of the latent images may be affected by factors such as imperfections or distortions in the system geometry of both the photoreceptor member and of the processing stations, and how precisely the transport system itself controls the speed of all image bearing sections of the photoreceptor member. By way of example, the photoreceptor member may be disposed such that its photoreceptor surface is angled or tilted relative to a true position in which the surface is to move through a processing station. This distortion alters both the lateral placement and speed of the photoreceptor surface with respect to the processing station. Improper placement and speed of the photoreceptor causes inaccurate placement of the latent image on the photoreceptor thereby leading to imperfection in the final output image as previously described. In the cases where the photoreceptor is a continuous loop belt, conventional systems for controlling photoreceptor belt lateral movement fall in two categories: passive alignment systems which make use of physical contact with the edge of the belt for alignment thereof; and active alignment systems utilizing active driving arrangements to alter the direction of travel of the belt. Existing passive alignment systems for controlling belt lateral movement generally comprise crowned or flanged rollers. Frequently, high local stresses are produced on the belt edges by flanged devices resulting in undue wear and buckling of the edges of the highly sensitive photoconductive belt. Active systems, on the other hand, are generally characterized by servo systems employing steering rollers. Servo systems generally apply less stress to the side edges of a belt, but incorporate more sophisticated and expensive hardware. Movement of the steering rollers may also cause physical distortion and other undesirable disturbances in the photo receptor belt at the imaging stations. The present invention overcomes the problems of the prior art as will be described in greater detail below.

SUMMARY OF THE INVENTION

In accordance with a first embodiment of the present invention, a transport system for transporting sheet media in an image transfer apparatus is provided. The transport system comprises a drive section, and at least one wheel drivingly connected to the drive section. The at least one wheel is disposed to contact the sheet media. The at least one wheel transports the sheet media generally in a process direction in the image transfer apparatus when the at least one wheel is driven by the drive section. The at least one wheel is steerable for orienting the axis of rotation of the at least one wheel in a predetermined direction, and for controlling a direction of travel of the sheet media relative to the process direction.

In accordance with a second embodiment of the present invention, an image transfer apparatus is provided. The image transfer apparatus comprises a frame, at least one imager, an image process station, and a transport system. The imager is supported by the frame for generating an image on a photoreceptor media. The image process station is supported by the frame for processing the image on the photoreceptor media. The transport system is mounted to the frame for transporting the photoreceptor media in a process direction between the imager and the image process station. The transport system is adapted for forming a slack section in the photoreceptor media between the imager and the image process station. The transport system comprises a pair of wheels which contact the photoreceptor media at the imager, and transport the photoreceptor media when the pair of wheels are rotated about their respective axes. Each of the transport wheels is pivotably mounted to the frame so that each transport wheel is pivotable relative to the frame about a corresponding pivot axis. The pair of transport wheels are pivoted relative to the frame for translating the photoreceptor media at one end of the slack section in a direction incrementally transverse to the process direction.

In accordance with a third embodiment of the present invention, an electro-photographic image transfer apparatus is provided. The image transfer apparatus comprises a frame, at least one imager, at least one developer, at least one fuser, and a transport system. The imager is connected to the frame for forming a latent image on a photoreceptor media. The developer is connected to the frame for developing the image on the photoreceptor media. The fuser is connected to the frame for transferring the image on the photoreceptor media to a final media. The transport system is mounted to the frame for transporting the photoreceptor media in a process direction to at least one of the imager, the developer, or the fuser, wherein the transport system comprises a pair of capstan wheels which propel the photoreceptor media in the process direction when the capstan wheels are rotated about their respective axes of rotation. Each wheel of the pair of capstan wheels is pivotably mounted to the frame so that each capstan wheel is pivotable about a corresponding pivot axis relative to the frame.

In accordance with a method of the present invention, a method for forming an image with an electro-photographic image transfer apparatus is provided. The method comprises the steps of providing the image transfer apparatus with an imager, providing the image transfer apparatus with a transport system, and pivoting a pair of wheels. The image transfer apparatus is provided with an imager for forming an image on a photoreceptor belt. The image transfer apparatus is provided with a transport system for moving the photoreceptor belt in a process direction. The transport system moves the photoreceptor belt in the process direction past the imager. The transport system is provided with at least one pair of wheels which propel an independent section of the photoreceptor belt. Each wheel of the pair of wheels is hinged to pivot about a corresponding pivot axis relative to the process direction. The pair of wheels pivot relative to the process direction to propel at least a portion of the photoreceptor belt in a vector direction incrementally transverse to the general process direction.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
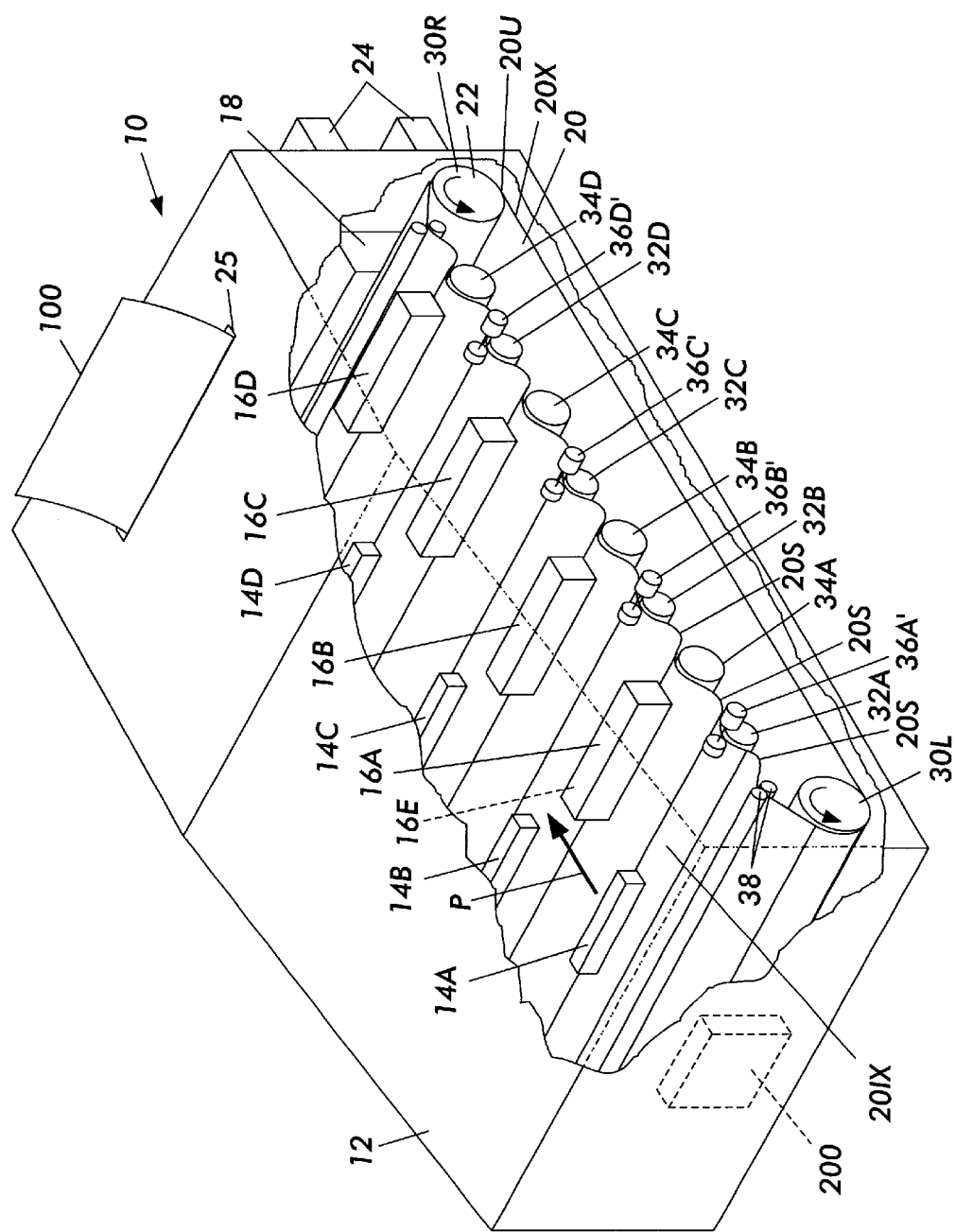
FIG. 1 is a schematic partial perspective view of an electro-photographic image transfer apparatus incorporating features of the present invention.

Referring to FIG. 1, there is shown a perspective view of an electro-photographic image transfer apparatus 10 incorporating features of the present invention. Although the present invention will be described with reference to the single embodiment shown in the drawings, it should be understood that the present invention can be embodied in many alternate forms. In addition, any suitable size, shape or type of elements or materials could be used.

The image transfer apparatus 10 generally comprises a frame 12 supporting imagers 14A–14D, developers 16A–16D, and a fuser 18. The frame 12 of the image transfer apparatus also holds a photoreceptor media 20 and a transport system 22 for recirculating the photoreceptor media 20. In the preferred embodiment, photoreceptor media 20 is a photoreceptor belt, though in alternate embodiments the image transfer apparatus may have any other suitable type of photoreceptor media. The image transfer apparatus further has one or more input trays or ports 24 through which blank image transfer media 100, such as blank paper sheets, are input into the image transfer apparatus. The image transfer apparatus also includes an output tray 25 into which the image transfer media 100 is delivered after an image is transferred onto the media. The image transfer apparatus 10 includes a handling system (not shown) for transporting the image transfer media from the input port through the apparatus to the output port. The transport system 22 circulates the photoreceptor belt 20 in a process direction (as indicated by arrow P) past the imagers 14A–14D, developers 16A–16D, and fuser 18. The photoreceptor belt is electrically charged at least in part by one or more charging members (not shown) of the image transfer apparatus 10. As the photoreceptor belt 20 is moved by transport system 22, the imagers 14A–14D form a latent image on the electrically charged portions of the photoreceptor media 20. The developers 16A–16D subsequently develop the latent image as the portion of the photoreceptor belt 20 having the latent image thereon travels past the developers 16A–16D. The developed image on the photoreceptor belt 20 is then transferred to the blank transfer media 100 (either by direct contact between the photoreceptor belt 20 and transfer media 100, or via an intermediate image transfer member (not shown) upon which an intermediate image is formed from the developed image on the photoreceptor media, which intermediate image is then transferred to the blank image transfer media 100). The fuser 18 fixes the transferred image thereby forming a final output image on the image transfer media 100, and the media 100 is expelled into the output tray 25 of the apparatus. The image transfer apparatus 10 has a cleaning member (not shown) for cleaning any toner remaining on the photoreceptor belt after image transfer. The transport system 22 continues advancing the photoreceptor belt 20 in the process direction and the process is then repeated. The image transfer apparatus includes a programmable controller 200. The controller 200 is controllably connected to the imagers 14A–14D, developers 16A–16D, fuser 18 and transfer system 22, to coordinate the operation of the aforementioned components of the image transfer apparatus and produce the final output image on the image transfer media 100. In accordance with the present invention, the photoreceptor belt 20 is advanced by transport system 22 in order for the latent images formed at the slack sections of belt 20 by each imager 14A–14D to be registered accurately as will be described in greater detail below.

The present invention will be described below with particular reference to a tandem, image-on-image (IOI) multi-color electro-photographic printer, though the invention is equally applicable to any other electro-photographic image transfer apparatus employing a belt such as for example, color, and mono-tone copiers, mono-tone printers, facsimile machines, or other multi-function devices. As can be seen in FIG. 1, in the preferred embodiment, the image transfer apparatus 10 has four imagers 14A–14D and four developers 16A–16D mounted to frame 12. In alternate embodiments, the image transfer apparatus may have any suitable number of imagers and developers. The imagers 14A–14D and developers 16A–16D are mounted in tandem, in alternating sequence, along the process direction (indicated by arrow P) of the apparatus 10 (see FIG. 1). The imagers 14A–14D and developers 16A–16D are preferably mounted in pairs with one developer paired with each imager. Hence, each developer 16A–16D develops a separate image formed by the corresponding imager 14A–14D on the photoreceptor belt 20. The imager/developer pairs may be located sufficiently far apart on frame 12 so that each paired imager and developer can generate a complete image on a given corresponding section 20IX of the photoreceptor belt 20 before that section reaches the next paired imager and developer. Accordingly, each paired imager 14A–14D and developer 16A–16D may form a separate complete image on separate portions of the photoreceptor belt 20. The controller 200 may operate the imagers 14A–14D and developers 16A–16D to generate the separate images on the photoreceptor belt 20 at substantially the same time.

Figure 3A:
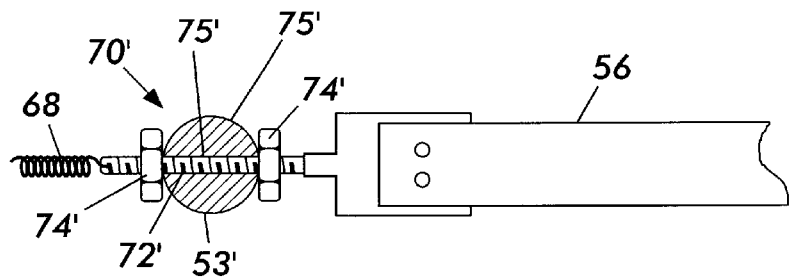
FIG. 3A is an enlarged elevation view of part of the guidance mechanism in FIG. 3.
Figure 3:
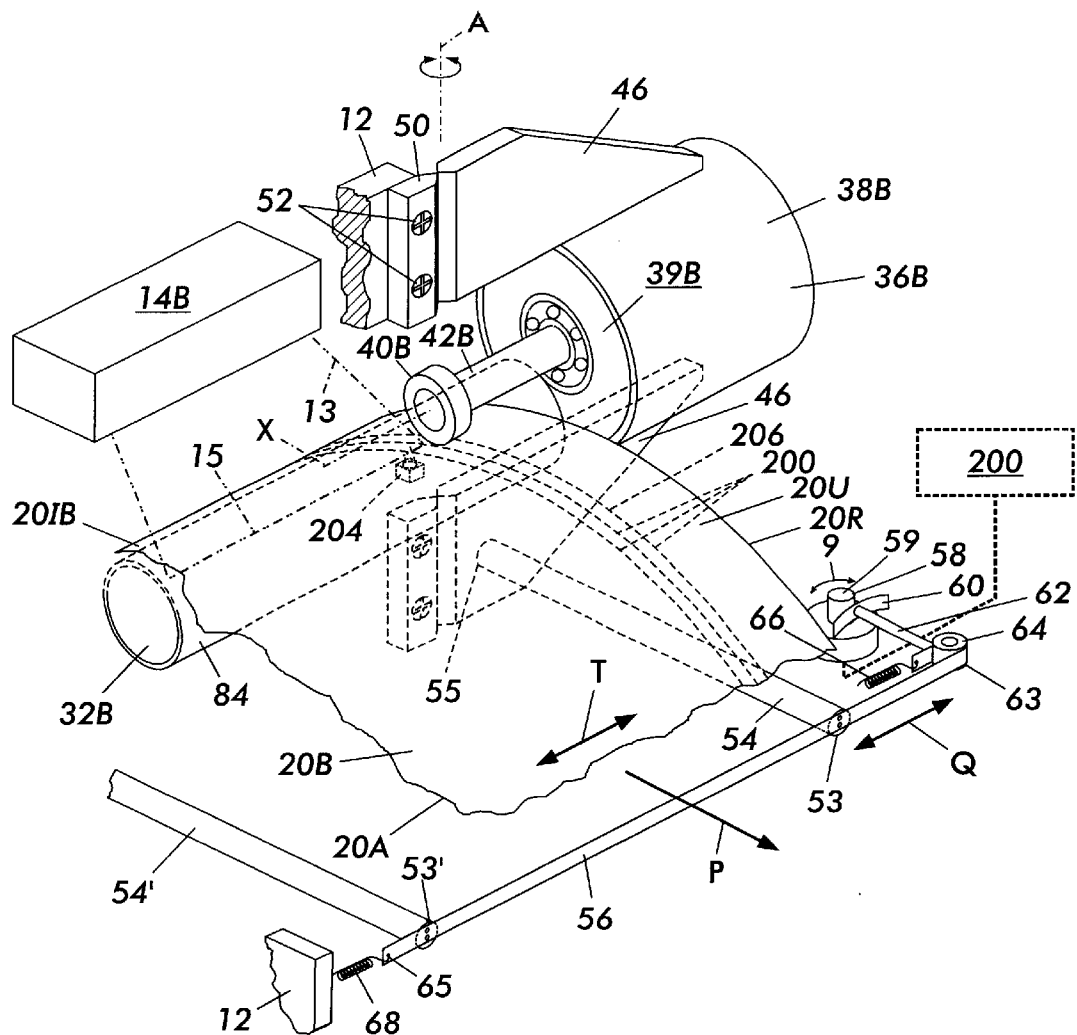
FIG. 3 is a schematic partial perspective view of the portion of the photoreceptor belt and a guidance mechanism of the belt transport system in FIG. 2.
Figure 4:
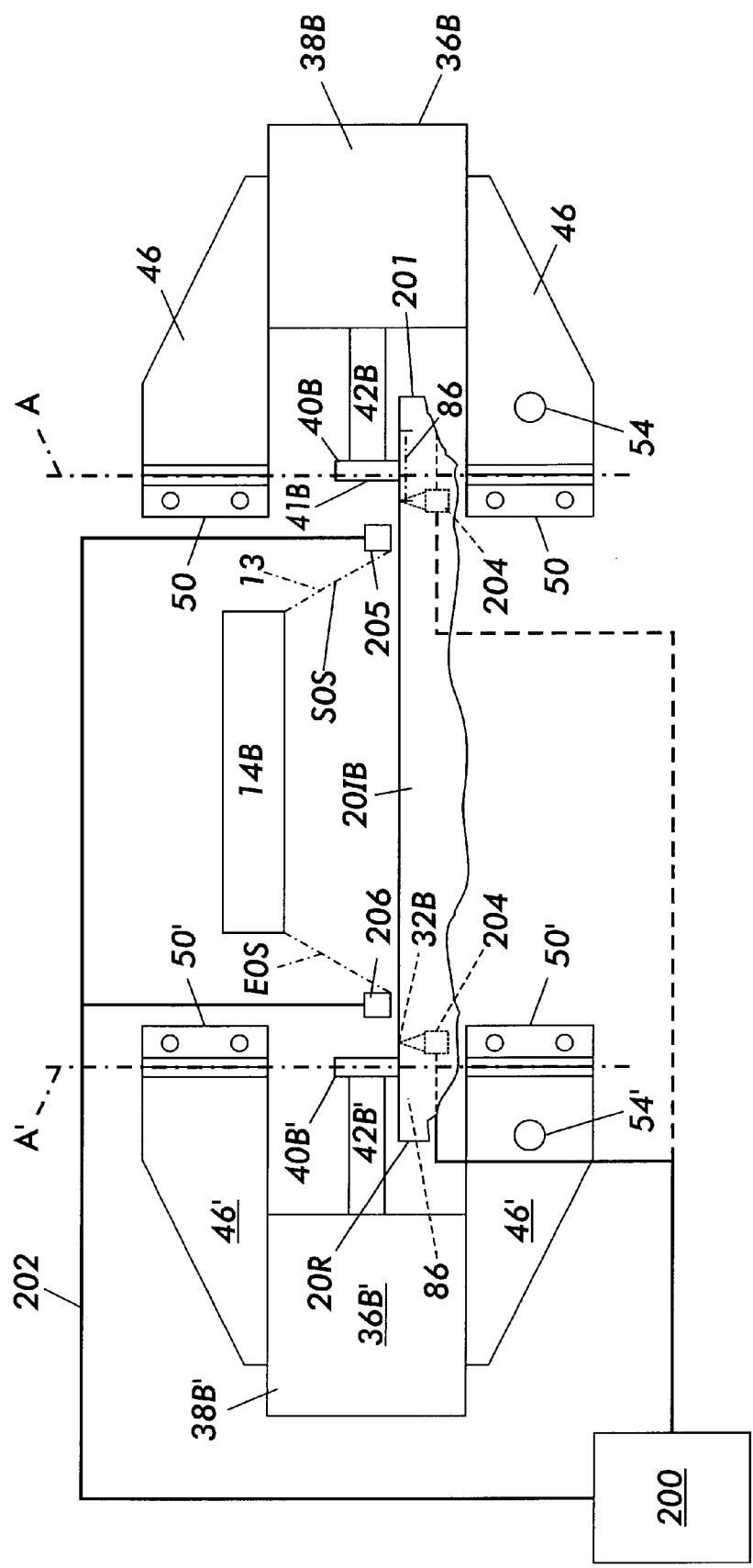
FIG. 4 is a schematic end view of the photoreceptor belt and guidance mechanism.

Still referring to FIG. 1, each imager 14A–14D is preferably a raster output scanner (ROS), though in alternate embodiments any other suitable type of imager such as for example, an electro-optical imager may be used. Referring also to FIGS. 3 and 4, there is shown respectively a partial perspective view of the photoreceptor belt 20 for one of the imagers 14B, and a partial elevation view of the belt 20 and imager 14B of the image transfer apparatus. Although, the following description will refer in particular to imager 14B, the features of all imagers 14A–14D are substantially the same. The imager 14B preferably includes a laser (not shown) which generates a collimated laser beam 13. The imager 14B is also provided with suitable means (not shown) for directing the laser beam 13 and scanning across the width of the photoreceptor belt 20 in a cross process, or transverse, direction relative to the process direction indicated by arrow P. Suitable means for scanning the laser beam may include for example, a rotating polygon surface having reflective facets. In this case, the laser beam of the imager 14B may be reflected by the rotating facets creating the scanning motion of the beam, to form a scan line 15 on the photoreceptor belt 20. The scan line 15 is orientated transverse to the process direction P. As noted before, prior to being exposed to the scanned laser beam, the photoreceptor belt may be electrically charged by suitable charging means. As the beam proceeds along the scan line, the beam 13 is modulated on and off by controller 200 to piecewise expose the photosensitive surface in accordance with the desired image and generate a latent line image on the photoreceptor belt 20. The beam 13 has a start of scan (SOS) position and an end of scan (EOS) position which respectively define the end points of the scan line 15 generated by the beam 13 on the photoreceptor belt. As the photoreceptor belt 20 advances past the imager 14B, the controller 200 supplies piecewise exposure control to the imager 14B for each subsequent scan line, sequentially forming an array of closely spaced lines of exposure on the photoreceptor belt. This array of image-wise exposed lines, or raster, forms the desired two-dimensional latent image on the photoreceptor belt. The orientation and placement of the latent image formed with the imager 14B on the photoreceptor belt 20 will be described in greater detail below.

Developers 16A–16D of the image transfer apparatus 10 are substantially similar and will be described in greater detail below with particular reference to one developer 16B. The developer may include a toner storage compartment or unit 16e, and a toner deposition element (not shown). The storage compartment 16e, and toner deposition element may be integrated into a removable cartridge mounted to the frame 12. Otherwise, the storage compartment, and toner deposition element of the developer may be individually mounted to the frame of the image transfer apparatus. The toner storage compartment 16e holds a supply of toner suitable for use in the electro-photographic imaging process. The storage compartment 16e preferably has an opening (not shown) for controllably releasing an amount of toner onto the toner deposition element of the developer 16B. The toner deposition element may be a roller (not shown) extending across the photoreceptor belt 20 transverse to the process direction P, though any other suitable toner deposition means may be used including fluidized beds, or other non-interactive toner deposition processes. The toner deposition element selectively deposits toner onto the belt thereby developing the latent image formed on the belt by, for example, imager 14B. Developer 16A–16D of the image transfer apparatus 10 may have toners of different colors therein. Accordingly, as noted previously, the developers 16A–16D may each develop separate images in different colors on the photoreceptor belt 20. In the image-on-image system shown in FIG. 1, separate color images are superimposed in registration over each other on the photoreceptor belt and simultaneously transferred to media 100.

Figure 3B:
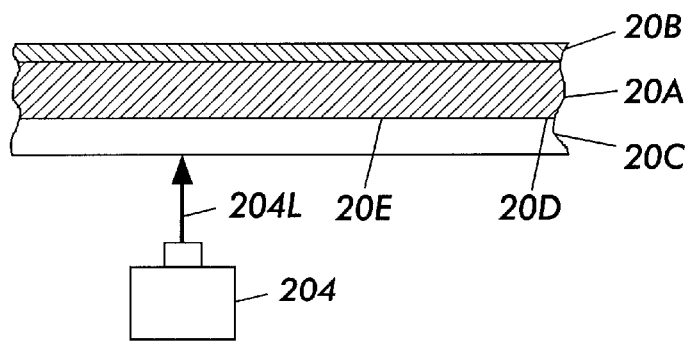
FIG. 3B is a cross-sectional view of the photoreceptor belt.

Referring now to FIG. 3B, in the preferred embodiment the photoreceptor belt 20 of image transfer apparatus 10 includes a base layer 20A made from a suitable electrically conductive material such as for example, a flexible metal sheet or ribbon. Otherwise, the base layer of the photoreceptor media may be made from a flexible non-metallic fiber composite web with conductive carbon fibers therein, a conductive polymer composition, a conductively coated insulating sheet, or any other suitable electrically conductive material. As can be seen in FIG. 3B, the photoreceptor belt 20 also includes a photoreceptive layer 20B. The photoreceptive layer 20B is disposed on one side of the base layer 20A. In the preferred embodiment, the base layer 20A may have a reflective surface 20C on the opposite face of the base layer from the photoreceptive layer. The reflective surface may extend across the entire width of the belt. In alternate embodiments, the reflective surface may be limited to a narrow longitudinal strip which extends lengthwise around the belt 20. In other alternate embodiments, the belt may have a number of reflective bands thereon. In still other embodiments, the belt may have a reflective band located on the same face of the base layer as the photoreceptive layer. In those cases, the reflective band may be placed adjacent to the exterior edges of the belt, and would not extend under the section of the photoreceptive layer which is exposed by the scanned laser beam of the imager. In the preferred embodiment, the reflective surface 20C of the belt 20 may be manufactured by polishing a portion of the metallic sheet making up the base layer 20A. Alternatively, if the base layer 20A is a polymer composition having a physically smooth surface, the reflective properties of surface 20C can be provided by chemical vapor deposition or evaporation of a suitable metallic alloy. As can be seen in FIGS. 3, 3B, the base layer 20A of the photoreceptive belt 20 has a number of tracks 20D formed thereon. In the preferred embodiment, the base layer has six tracks 20D (only three tracks 20D are shown in FIG. 3 for example purposes). The tracks 20D are formed in the reflective surface 20C of the base layer 20A and extend longitudinally along the photoreceptive belt. Tracks 20D contain encoded information indicating absolute photoreceptor belt position in the process direction. The position information in each track 20D may be encoded using optically readable means. For example, the bottom 20E (see FIG. 3B) of each track 20D may be reflective and contain a series of pits (not shown) therein representing a longitudinal position on the belt 20. The series of pits in the bottom 20E of each track may be registered using a laser scanner which scans along the tracks 20D. In alternate embodiments, the tracks in the photoreceptor belt may also include encoded information indicating the cross-process or transverse position of the belt with respect to some benchmark such as for example, one of the longitudinal edges of the belt. Such information may also be registered using a separate laser scanner for scanning the tracks. The six tracks 20D in the photoreceptor belt 20 may be disposed on the belt in two groups 20G of three tracks 20D (only one group of tracks is shown in FIG. 3). Each group of tracks 20G is located proximate to the lateral edge 20F of the belt 20. Moreover, the three tracks 20D in each group 20G may be placed in sufficiently close proximity to each other so that all the tracks in one group may be scanned simultaneously using one optical reader or laser scanner as will be described further below. In alternate embodiments, the photoreceptor belt may have any suitable number of tracks encoded with information indicating belt calibration data and relative sensitivity profiles, the exact length of the belt loop for initialization purposes, as well as housekeeping information such as the positions of small defects at the time of manufacture, date, and other information relating to manufacture of the belt. The tracks may be segregated in any desired number of groups, or distributed generally uniformly across the belt, and may be located proximate to the edges or in any other suitable location on the belt. In other alternate embodiments, the photoreceptor belt may include any other suitable feature such as for example, electro-optical features, or electro-magnetic features, containing information for indicating both the process and cross-process locations of the belt. For example, the photoreceptor belt may include a number of slits at the edges, or opaque bar code patterns which may be registered and counted using a photocell to establish the initial process location of the belt.

Referring now again to FIGS. 1, 3 and 4, the belt transport system 22 of the image transfer apparatus 10 generally comprises feed roller 30F, idler roller 30R, tension-decoupling rollers 38, support platens 32A–32D, support rollers 34A–34D, and capstan mechanisms 36A–36D. As can be seen in FIG. 1, the photoreceptor belt 20 is preferably arranged on the transport system 22 to have an upper section 20U which is substantially slack. The lower portion 20Z of the photoreceptor belt 20 on the transport system 22 may be under some tension. The tension-decoupling rollers 38, support patens 32A–32D, and support rollers 34A–34D are generally arranged in a train in the process direction P to support the slack upper portion 20U of the belt. The transport system may also have a number of support rollers (not shown) upon which the lower section 20Z of the belt is supported, otherwise the lower section of the belt may be supported by a slide surface of the apparatus. In alternate embodiments, both the upper and lower portions of the belt may be slack. In other alternate embodiments, the upper portion of the belt may be under tension, and the lower portion may be slack. The feed roller 30F is preferably located at the front end or top of the belt rotation in the process direction P. The feed roller 30F may be powered by a suitable motor (not shown) such as an electric motor which turns the feed roller. The feed roller 30F may engage the photoreceptor belt 20 using a sprocket (not shown), or by contact friction, to drive the belt 20 in the process direction P when the roller 30F is rotated in a clockwise direction as shown in FIG. 1. The engagement between the belt 20 and feed roller 30F places the lower portion 20Z of the belt under tension when feed roller 30F is turning. The tension generated by feed roller 30F on belt 20 pulls the belt over the idler roller 30R. The idler roller 30R, which is mounted to the frame 12 of the apparatus 10 to rotate freely, supports the photoreceptor belt at the rear end or bottom of the belt in the process direction.

As can be seen in FIG. 1, a pair of tension decoupling rollers 38 are mounted on frame 12 inwards from the feed roller 30F. The tension decoupling rollers 38 comprise a pair of opposing rollers which pinch the upper portion 20U of the photoreceptor belt in between. The pair of rollers 38 generates a clamping force on the upper portion 20U of the photoreceptor belt. The clamping force generated by the tensioning decoupling rollers 38 on the upper portion 20U of the belt maintains the lower portion 20Z of the belt around the feed and idler rollers 30F, 30R in tension. Conversely, the clamping force allows the upper portion 20U of the belt 20 to be slack. The tension decoupling rollers 38 may include a camming mechanism to move the rollers apart and release the belt from in between, and hence, allow removal of the belt. In alternate embodiments, any other suitable means may be used for decoupling tension on the upper portion, or the portion of the photoreceptor belt upon which imaging is being performed, from the opposite portion of the belt which is under tension from the transport system. For example, one or more sprockets may be used which engage the photoreceptor belt to maintain tension on one section of the belt while allowing the imaging section to be substantially without tension. The tension decoupling rollers are preferably also powered, using the transmission system (not shown) from the feed rollers, or otherwise independently driven, in order to locally transport the belt in the process direction P from the feed roller 30F.

Figure 2:
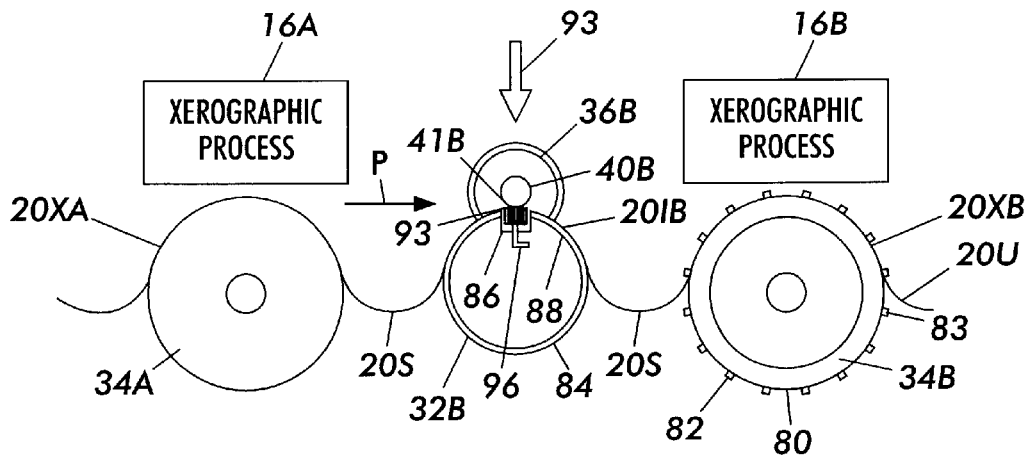
FIG. 2 is a schematic partial elevation view of a representative portion of a photoreceptor belt, an imager, two developers, and a portion of a transport system of the image transfer apparatus in FIG. 1.

As noted previously, the upper section 20U of the photoreceptor belt 20 lies substantially slack over the support platens 32A–32D, and support rollers 34A–34D. As can be seen in FIGS. 1–2, the upper section 20U of the belt is supported in such a manner that slack sections 20S of the belt are formed between each of the support platens 32A–32D and support rollers 34A–34D of the transport system 22 (FIG. 2 illustrates only a portion of the belt 20 supported by one support platen 32B and the adjacent support rollers 34A, 34B for example purposes.) As can be realized from FIG. 1, the upper portion 20U of the belt has a slack section 20S on each side of each support platen 32A–32D). Each support platen 32A–32D supports a corresponding section of the belt, as the belt moves in the process direction over the platens at the respective imagers 14A–14D. For example, as shown in FIG. 2, support platens 32B supports belt section 20IB at imager 14B (see also FIG. 1). Each support roller 34A–34D of the transport system 22 supports a corresponding section of the belt, as the belt moves over the support rollers at their respective developers 16A–16D. For example, as shown in FIG. 2, support rollers 34A, 34B support corresponding belt sections 20XA, 20XB at respective developers 16A, 16B. As the belt 20 moves in the process direction indicated by arrow P, the belt progressively moves through slack sections 20S to sequential sections supported by support platens 32A–32D, (such as section 20IB in FIG. 2) and the sections supported by support rollers 34A–34D (such as sections 20XA, 20XB in FIG. 2). The portion of the belt, depicted in FIG. 2 is representative of the remainder of the upper section 20U of the belt, and the configuration of the slack section 20S and the sections supported by support platens 32A–32D, and support rollers 34A–34D will be described with particular reference to the sections shown in FIG. 2. Slack sections 20S have sufficient droop to uncoupled belt section 20IB on the platen 32B from belt sections 20XA, 20XB on the rollers 34A, 34B. The droop of the slack sections 20S however do not cause the belt section 20IB, 20XA, 20XB respectively on the support platens 32B, and support rollers 34A, 34B to have excessive weight. The uncoupling provided by the slack sections 20S between belt section 20IB and adjacent sections 20XA, 20XB enable section 20IB to be moved relatively to either section 20XA, 20XB both in the general process direction indicated by arrow P and in a partial cross-process or transverse direction relative to the process direction. The slack sections 20S provide the relative play used for dynamically adjusting the belt orientation relative to imager 14B, accommodating a net transverse displacement, or advancing belt section 20IB at a different rate and direction than belt sections 20XA, 20XB.

Support rollers 34A–34D are substantially similar to each other, and will be described below with particular reference to representative roller 34B shown in FIG. 2. Support roller 34B comprises a generally cylindrical roller element 80 which is rotatably mounted to the frame 12 (see FIG. 1). The roller element 80 has a suitable diameter for holding corresponding belt section 20XB in position for developer 16B to develop a latent image on the belt section as described previously. In the preferred embodiment, the support roller 34B further comprises a sprocket 82 (see FIG. 2), disposed on the roller element 80. The sprocket 82 may have teeth 83 disposed circumferentially around the roller element 80 which positively engage complementary apertures (not shown) formed in the belt 20. The sprocket teeth 83 are preferably disposed on the roller element 80 near the lateral edges 20F of the belt 20 (see FIG. 3). In alternate embodiments, the support roller 34 may be provided with any other suitable means for engaging or providing a no slip contact between the belt and roller when the belt is moving. For example, the roller may have a rubberized surface with a coefficient of friction sufficient to prevent slip between the belt and roller. The support roller 34B may be powered by a suitable motor or drive (not shown) to rotate the roller and thereby to independently move the belt section 20XB in the process direction P. By way of example, when support roller 34B is rotated in a clockwise direction, the sprocket 82 engaging belt section 20XB moves the belt section in the process direction P. Slack section 20S between support roller 34B and support platen 32B allows the support roller 34B to move belt section 20XB without affecting movement of belt section 20IB on the support platen 32B.

As stated previously, support platens 32A–32D support sections of the photoreceptor belt (similar to section 20 IB) in front of the imagers 14A–14D. The support platen 32A–32D are substantially similar to each other and will be described in detail below with particular reference to platen 32B shown in FIGS. 2–3. Support platen 32B generally comprises a shoe 84. In the preferred embodiment, the shoe 84 has a generally cylindrical shape which is hollow. In alternate embodiments, the shoe of the support platen may have any other suitable shape, such as for example, a semi-cylindrical shape orientated with the rounded portion towards the imager. In other alternate embodiments, the shoe need not be hollow, but rather may have a solid cross section. The shoe 84 may be made from any suitable metal, such as for example, aluminum alloy, or otherwise may be made from a non-metallic material such as for example, a transparent plastic. As can be realized from FIGS. 1 and 3, the shoe 84 extends longitudinally transverse to the process direction P. The shoe 84 has a sufficient length to support the belt 20 along its entire width. In the preferred embodiment, the shoe 84 is fixedly mounted to the frame 12 of the apparatus 10. The shoe is provided with a suitable plastic coating (not shown) such as for example, Mylar™ sheets, which have a low coefficient of friction allowing the belt 20 to readily slide over the shoe 84. In alternate embodiments, the shoe may be rotatably mounted to the frame to rotate freely when the belt is moved on top of the shoe.

Figure 7A:
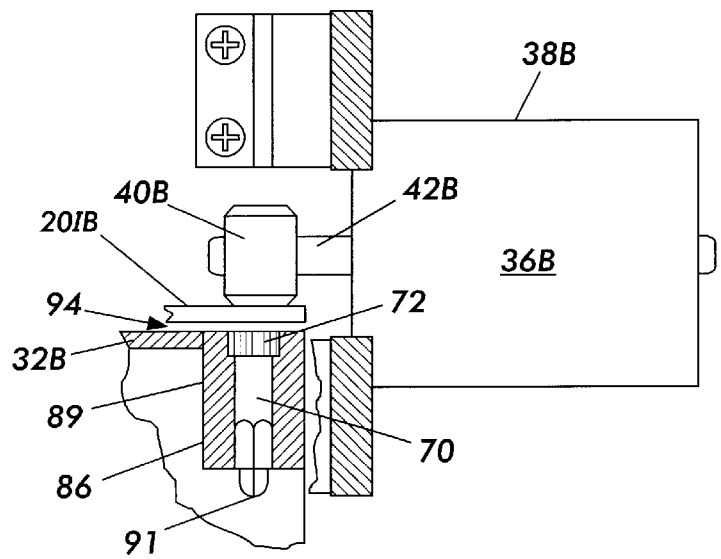
FIGS. 7A–7B are respectively an end elevation view, and a side elevation view of the guiding mechanism in accordance with a first preferred embodiment of the present invention.
Figure 7B:
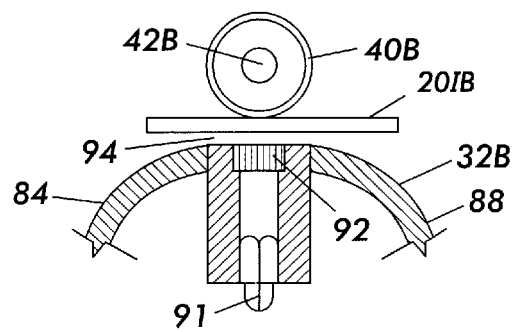

In accordance with a first preferred embodiment of the present invention, the support platen 34B includes an air bearing 86 (see FIG. 2). Air bearing 86 is mounted on the top portion 88 of the shoe 84, and may be disposed longitudinally along the shoe 84. FIGS. 7A, 7B show cross sectional views of an air bearing in accordance with the preferred embodiment. The air bearing comprises a rigid block 89 with a chamber 90 formed therein. The block 89 may be formed from any suitable material such as aluminum alloy. An air inlet fitting 91 is fitted into one end of the chamber 90. An orifice plug 92 is fitted into the outlet end of the chamber 90. As is appreciated by those practiced in the air-bearing art, plug 92 is preferably made of porous material such as graphite, or honeycomb plastic which provides substantially constant air flow through air bearing 86 without significant variation with design load. The air inlet fitting 91 of the air bearing is connected to an air supply line 96 (see FIG. 2) which is in turn connected to an air supply (not shown) such as an air pump or compressor in apparatus 10. The air supply may supply air at a pressure in the range of about 10–50 psig. The block 89 of air bearing 86 is mounted through a conformal opening in the upper portion 88 of shoe 84. The block 89 may be secured to the shoe by soldering, braising, force fitting, or any other suitable means. The top of the air bearing 86 is substantially flush with the upper portion 88 of the shoe. In alternate embodiments the air bearings in the platen shoe may have any other suitable configurations. For example, a hole or series of holes may be drilled through the block in the interior chamber to provide an air orifice or orifices in lieu of the porous plug 92 of the preferred embodiment. In other alternate embodiments, the block may be elongated to allow for a plurality of exhaust outlets or orifices which may be orientated longitudinally along the length of the shoe. In still other alternate embodiments, the shoe of the support platen may have holes drilled therethrough, and the interior of the shoe may be pressurized from the air supply in order to form a plenum, or a plurality of separate plenums, for a full-width air bearing. The air bearings 86 supply air support under the belt section 20IB (see FIGS. 7A–7B). The curvature of shoe 84 is designed to conform to the natural shape of belt section 20IB draped over platen 32B helping to trap the air from bearings 86 and improve the effectiveness of air film 94 between the belt section 20IB and the upper section 88 of the shoe. In operation, the pressure of air film 94 may range between a few inches of water and the air supply pressure. The air film 94 provides for substantially frictionless movement of the belt over the shoe 84 and biases the belt section 20IB positively against capstan 36B, 36B' which advances the belt section in the general process direction P. In order to balance and stabilize the air film 94 under belt section 20IB, the slack section 20S on either side of the support platen 32B (see FIG. 2) may be under a slight vacuum induced by suction from fans in the apparatus (not shown).

In accordance with a second preferred embodiment of the present invention, the support platen may include a pinch roller assembly 186 in lieu of the air bearing 86. FIGS.

Figure 8A:
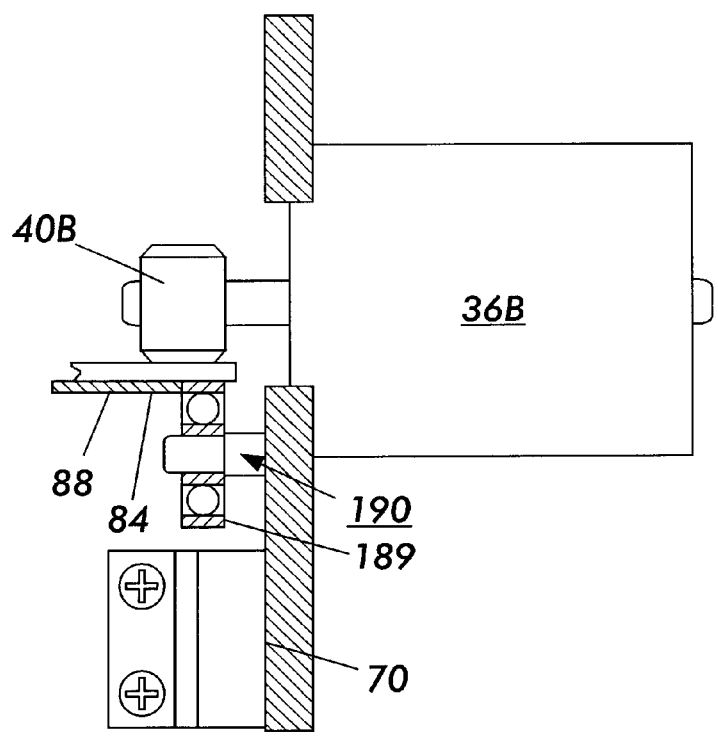
FIGS. 8A–8B are respectively an end elevation view, and a side elevation view of the guiding mechanism in accordance with a second preferred embodiment of the present invention.
Figure 8B:
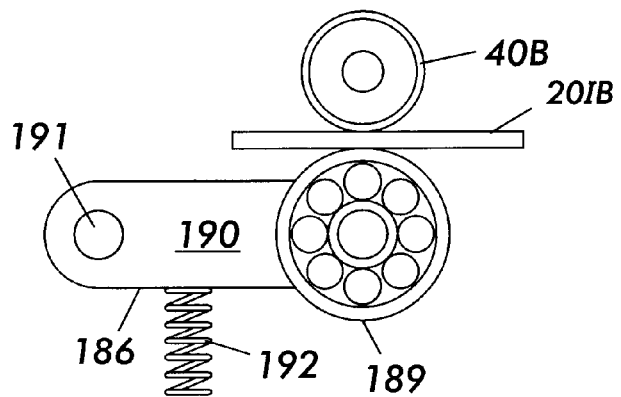

8A–8B respectively show a schematic end view, and elevation view of the pinch roller assembly 186. The pinch roller assembly 186 generally comprises a lever arm 190, with a roller, or ball bearing 189 mounted thereon. The lever arm 190 is pivotably mounted by a pivot shaft 191 to the frame 12 so that the arm may pivot relative to the frame. The roller bearing 189 is mounted at an opposite end of the arm from the pivot shaft 191. As seen in FIG. 8A, in this embodiment, the support portion of the outer race of the bearing 189 is substantially flush with the upper surface 88 of the shoe 84. Spring 192 is mounted to the arm 190 between the pivot shaft 191 and the bearing 189. Spring 192 is connected to a portion of the frame 12 and urges the arm 190 upwards causing the bearing 189 to pinch a portion of belt section 20IB against the capstan 36B. Capstan 36B, together with pivot shaft 191, spring 192, and bearing 189 on arm 190, form an assembly that is pivotably mounted to the frame 12 of the apparatus 10 and is oriented as a whole for the purposes of advancing the pinched point of the belt in a specific direction. In alternate embodiments, the pinch roller assembly may have any other suitable configuration, including, for example, mounting the spring from the shoe of the support platen, or spring loading the shoe itself so that the shoe presses the belt against the capstan.

The transport system 22 comprises four pairs of opposing capstan assemblies with one pair of capstan assemblies located at each of the support platens 32A–32D. One capstan from each pair of capstan assemblies is mounted on each side of the photoreceptor belt 20. FIG. 1 shows the capstan assemblies 36A'–36D' from each pair of capstan assemblies located along the right side of the photoreceptor belt. As can be seen in FIG. 4, the opposing capstan assemblies 36B, 36B' of each pair of capstan assemblies are substantially similar to each other but orientated opposite hand (FIG. 4 shows an end view of one pair of capstans 36B, 36B' for example purposes). Similar features of the capstans are similarly numbered with the prime symbol (') indicating that the capstan is mounted on the right side of the belt. In view of the similarities, the capstans will be described below with particular reference to capstan 36B shown schematically in FIG. 3. Capstan 36B generally comprises a motor section 38B connected to a capstan wheel 40B by drive shaft 42B. In the preferred embodiment, the motor section 38B includes a suitable motor 39B such as a small electric servo motor (the low friction forces between belt section 20IB and support platen 32B in both process and cross-process directions due to the air film 94, allows use of very small low power motors to drive the capstan wheel). The drive shaft 42B is a straight shaft directly coupling the drive motor to the capstan wheel 40B. The capstan wheel 40B is fixedly mounted to the shaft, and rotates in unison with the shaft 42B when the shaft is rotated about its longitudinal axis X (see FIG. 3). The capstan wheel 40B may be made of any suitable material such as metal or plastic. In addition, the outer surface with which capstan wheel 40B contacts the belt section 20IB may be rubberized or otherwise treated to control its frictional properties. The diameter of the wheel 40B is sized to provide the desired operational belt velocity within the optimum operating speed range of the servo motor 39B. As seen in FIG. 3, the motor section 38B is mounted to the frame 12 of the apparatus 10 by two brackets 46, though any number of brackets may be used having any suitable configuration. The brackets 46 are attached to the frame by hinges 50. Hinges 50 allow the entire capstan assembly 36B from motor section 38B to wheel 40B to pivot as a unit about hinge axis A of hinges 50. Hinge axis A is substantially orthogonal to drive axis X about which the capstan wheel 40B is rotated by the motor 39B. As can be seen in FIG. 4, the capstan wheel 40B is mounted to the shaft so that the point of contact 41B between the wheel and belt section 20IB is aligned with hinge axis A. Hinges 50 may be mounted to frame 12 with mechanical fasteners 52 such as for example, machine screws, bolts, or any other suitable means including welding, or brazing. The hinges 50 are mounted to the frame 12 so that in the process direction P, the longitudinal axis X of shaft 42B is generally aligned at the center of the top 93 of support platen 33B (see FIG. 2). In this position, the contact point 41B of the wheel 40B is coincident with hinge axis A, and hence, the capstan wheel 40B pivots (without substantially any translation) about the contact point 41B when the motor section 38B is pivoted about hinge axis A. Accordingly, pivoting the motor section 38B of the capstan assembly 36B about its hinge axis A causes the orientation of the capstan wheel 40B to change relative to support platen 32B, and hence, also relative to the general process direction P, but does not effect a change in the location of the contact point 41B on the support platen or the belt section 20IB supported by the support platen. As can be realized from FIG. 4, the opposing capstan assembly 36B' has a motor section 38B' which swings about hinge axis A' of hinges 50' supporting the capstan assembly on the frame. Hence, both capstan wheels 40B, 40B' contacting the belt section 20IB at the support platen 32B may pivot about the respective hinge axes A, A' when the corresponding motor sections 38B, 38B' are rotated about the hinge axes A, A'. In alternate embodiments, the capstan assemblies may include a coupling mounted on the drive shaft powering the capstan wheels. The coupling would allow the wheel to pivot relative to the motor section. In that case, the capstan wheels may be pivoted relative to the belt section without displacing the motor section.

The opposing capstan assemblies 36B, 36B' are coupled together by a steering linkage which causes the capstan wheels to pivot about corresponding hinge axes A, A' substantially in unison. Referring now to FIGS. 3 and 4, the steering linkage comprises a pair of steering arms 54, 54', tie member 56, tension springs 66, 68, and steering unit 58. The steering linkage shown in FIGS. 3 and 4, and described below are merely an example of a suitable steering system for steering the capstan wheels in accordance with the present invention, though any other suitable steering system for the capstan wheels may be used. As seen in FIG. 3, the steering arms 54 are rods which are fixedly mounted at one end 55 to the motor section 38B, 38B' (see also FIG. 4) of the capstan assemblies 32B, 38B'. In the preferred embodiment, the steering arms 54, 54' are mounted to one of the brackets 46, 46' holding the motor section 38B, 38B' on hinges 50, 50', though in alternate embodiments, the steering arms may be attached to any other suitable location on the pivotable motor section. In the preferred embodiment, the steering arms 54, 54' extend longitudinally substantially in the process direction P, though in alternate embodiments, the steering arms may be extended in any other suitable direction to provide a moment arm for rotating the motor sections about the hinge axes A, A' of the corresponding capstan assembly. The opposite end 53, 53' of the steering arms 54, 54' is connected to the tie member 56 as shown in FIG. 3. Tie member 56 may be a flat metal, or plastic ribbon, though in alternate embodiments the tie member may be a rigid bar or rod. Tie member 56 extends substantially orthogonally relative to the process direction P. One end 65 of the tie member 56 is connected by tension spring 68 to the frame 12 of the apparatus. At the other end 63, the tie member 56 is disposed around a pulley wheel 64 (mounted to the frame by a shaft which is not shown) and connected by a second tension spring 66 to the frame. As can be realized from FIG. 3, the two tension springs 66, 68 at opposite ends of the tie member 56 maintain the ribbon in tension, and thereby prevent the ribbon from becoming slack. In the preferred embodiment, the pulley wheel 64 is drivingly connected to the steering unit 58 by crank member 62. The crank 62 is connected to the pulley wheel 64 so that the crank and wheel rotate substantially in unison. Steering unit 58 includes a suitable servo motor which operates steering output shaft 59. Crank 62 has a contact member 60 which couples the crank 62 to the steering output shaft 59 of the steering unit. The contact member 60 and output shaft 59 may be provided with meshing gear teeth (not shown) which transfer movement from the output shaft 59 to the contact member 60, and then to crank 62. Otherwise, the output shaft and contact member may be provided with a suitable non-skid surface, such as a rubberized surface, so that rotation of the output shaft causes non-slip counter-rotation of the contact member. In the preferred embodiment, coupling between contact member 60 and output shaft 59 is provided by a tensioned metal ribbon looped around output shaft 59 (not shown). As will be understood by those practicing the servo art, the tensioned ribbon is anchored to shaft 59 at its midpoint, and to the contact member at its extremities, thereby providing a positive backlash-free linkage between output shaft 59 and contact member 60. Tie member 56 may be similarly coupled to pulley 64. Steering inputs indicated by arrow q(see FIG. 3) from the steering output shaft 59 are transmitted by crank 62 to the pulley 64. Rotation of the pulley 64 in turn effects linear movement of the tie member 56 in the direction indicated by arrow Q. The linear movement of the tie member 56, in the direction of arrow Q moves steering arms 54, 54' thereby causing the motor sections 38B, 38B' of the capstan assemblies to pivot about corresponding hinge axes A, A'. By way of example, when the steering output shaft 59 is rotated a given amount in a clockwise direction, the contact member 60 is reciprocally rotated the same amount in a counterclockwise direction. This counterclockwise rotation is transferred via crank 62 to pulley wheel 64. The pulley wheel 64, which is a no-slip contact with tie member 56, causes the tie member to be pulled linearly to the left (along the direction indicated by arrow Q). The left pull of the tie member 56 is then translated by steering arms 56 to counterclockwise rotation of the motor sections 38B, 38B' respectively about hinge axes A, A'. Thus, the capstan wheels 40B, 40B' pivot substantially in place relative to the belt section 20IB supported by the support platen 32B. The length ratio between the steering arms 54, 54' and the crank 62 on pulley wheels 64 may be selected to provide sufficient reduction of the steering inputs from the steering shaft 59 in order to achieve the optimum range of precise incremental steering action at the capstan wheels 40B 40B'. The steering motor of the steering unit 58 is also selected in order to provide precise rotational movements of steering shaft 59. For example, the steering motor may be a stepper motor, which when activated by controller 200 turns the shaft 59 in precise predetermined amounts. In the preferred embodiment, the steering actuation is provided by a servo motor. In alternate embodiments, any other suitable type of motor may be used including, an electric solenoid having a reciprocating motion when energized. In other alternate embodiments, the steering unit may be mounted coaxially with the tie member pulley, so that the output shaft of the steering motor directly rotates the pulley wheel. In still other embodiments the steering output shaft may be provided with a worm gear which engages teeth on the tie member to directly translate the tie member in a direction transverse to the process direction P. It will be understood that tie member 56 may be omitted and the paired capstans individually steered, if desired, at the expense of incorporating an additional steering actuator and linkage for each capstan pair.

Figure 3C:
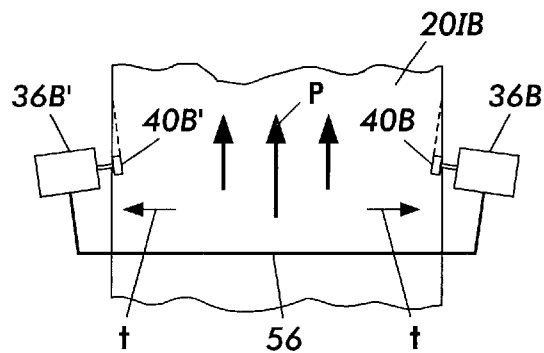
FIG. 3C is a schematic plan view of the guidance mechanism in FIG. 3 showing the mechanism in a first configuration.

Referring now to FIG. 3A, in the preferred embodiment the steering linkage has a toe-in/toe-out adjustment mechanism 701 for adjusting the toe-in/toe-out alignment of the capstan wheels 40B, 40B'. FIG. 3A illustrates the adjustment mechanism 70' for the right capstan assembly 36B'. However, all the toe-in/toe-out adjustment mechanisms for the pairs of capstan assemblies are substantially similar to each other. The adjustment mechanism 70' is located at the interface between the steering arm 54' and tie member 56. The mechanism 70' generally comprises a threaded rod 72', and a pair of threaded nuts 74'. The threaded rods 74' is mounted to the tie member 56. The threaded rod may be mounted to the end of the tie member as shown in FIG. 3A, or otherwise may be mounted on the top, or bottom edges of the tie member. The end 53' of steering arm 54, preferably, has a hole 75' therein through which the threaded rod is inserted. The nuts 74' are threaded onto the threaded rod 72' on either side of the steering arm 54'. The nuts 74' are threaded along the threaded rod 72' in order to adjust the toe-in/toe-out of the capstan wheel 40B' (see also FIGS. 3C, 4) as desired. The nuts 74' are preferably self-locking nuts which stay in position on the threaded rod 72' after setting the toe-in/toe-out of the capstan wheel 40B'. As can be realized from FIG. 3A, the toe-in/toe-out of each capstan wheel 40B', 40B is adjusted independently. In the preferred embodiment, the toe-in/toe-out of the respective capstan wheels 40B, 40B' of the pair of capstan assemblies 36B, 36B' as well as the capstan wheels of other pairs of other capstan assemblies 36A, 36A', 36C, 36C', 36D, 36D' is set so that the capstan wheels are slightly toed-in. FIG. 3C shows the capstan assemblies 36B, 36B' in an initial position wherein the capstan 36B, 36B' are moving the belt section 20IB true to process direction P, with the capstan wheels 40B, 40B' being slightly toed in. The toe-in of the capstan wheels 40B, 40B' shown in FIG. 3C is exaggerated for illustration purposes. Belt section 20IB is pinched against the capstan wheels 40B, 40B' by air bearings 86, in accordance with a first preferred embodiment of the present invention (see FIGS. 7A–7B), or otherwise by pinch rollers 189 in accordance with a second preferred embodiment of the present invention. Accordingly, when the capstan wheels 40B, 40B' are rotating (about axis X, see FIG. 3), the toe-in of the capstan wheels generates tension in the belt section 20IB between the capstan wheels which maintains the belt section taut between the capstan wheels. In alternate embodiments, the capstan wheels may be toed-out which similarly generates tension in the belt section between the capstan wheels, when the capstan wheels are rotating.

Referring now again to FIGS. 3–4, the image transfer apparatus includes belt position sensors 204 and start-of-scan (SOS), and end-of-scan (EOS) sensors 205, 206 which are communicably connected by suitable means 202 to the controller 200 of the apparatus 10. The belt position sensors 204 register the position of the left and right belt edges in the process, and cross-process, directions and send suitable signals indicating these position to the controller 200. The SOS and EOS sensors 205, 206 detect the laser beam 13 of the imager respectively of the start-of-scan and end-of-scan positions, and send signals to the controller 200 indicating when the laser beam 13 is at the SOS and EOS positions during its scan across the photoreceptor belt. Two belt position sensors, similar to sensors 204 are located at each support platen 32A–32D. SOS and EOS sensors, similar to sensors 205, 206, are also located to respectively detect the SOS and EOS positions of the laser beam of each imager 14A–14D. FIG. 4 illustrates belt position sensors 204, and SOS and EOS sensors 205, 206 located at support platen 32B for example purposes. Referring also to FIGS. 3–3B, the belt position sensors 204 are located on the frame to register the position of the edge of belt section 20IB using the group of tracks 20G formed at the edge 20F of the belt 20. In the preferred embodiment, each sensor 204 is placed below the belt to scan the tracks 20D in the lower surface 20C of the belt (see FIG. 3B). The sensor 204 may be disposed inside the support platen 32B, as shown in FIG. 3. In such a case, the platen shoe 84 may be provided with an aperture through which the three tracks 20D at the edge of the belt section 20IB are visible to the sensor. Sensor 204 is preferably an optical sensor which may include a laser diode generating a laser beam 204L. The laser beam 204L may be directed through a series of optical lenses and mirrors (not shown) to the laser belt surface 20C. The laser beam 204L may be further directed through a beam splitter or diffractive element (not shown) in order to generate a laser beam directed at each of the three tracks 20D in the belt. The laser beam may be reflected by the tracks 20D back to the sensor 204 which may include suitable photo-cells to register the reflected beams. The surface features formed in the tracks 20D encoding the true position of the belt edge in the process direction, modulate the laser beam reflected by the track 20D. The modulations of the reflected beam are registered by the sensor 204 to indicate the true position of the edge of belt section 20IB in the process direction to the controller 200. In addition, the sensor 204 may be located such that the sensor registers the three tracks 20D of group 20G at one edge 20F of the belt section 20IB, when the belt edge 20F is at, or proximate to, the optimal position in the cross-process direction (indicated by arrow T in FIG. 3). The optimal position is a default position of the belt section 20IB wherein the laser beam 13 is of the imager has the SOS and EOS positions in a desired location on the belt section. Sensor 204 may detect both the number of tracks in its field of view, and the position of the detected tracks as well as auxiliary track extensions in order for the controller 200 to determine whether the belt section 20IB is grossly shifted left or right from its optimal position. For example, if the sensors 204 register two tracks 20D in its field of view, and the tracks are on the left side of the field of view, the sensor sends a suitable signal indicating this shift to controller 200. The controller 200 has suitable programming to identify from the sensor signal that the belt section 20IB on the platen 32B is shifted to the left from its proper position. Conversely, if the sensor 204 signals that only two tracks 20D were visible in the right side of the field of view, or that the auxiliary track extension pattern indicating a relatively large displacement has been detected, the controller 200 would determined that belt section 20IB is shifted to the right. The auxiliary track extensions, which may consist of simple bar patterns adjacent on either side of tracks 20D, may be used for example, when a new belt has been installed, or at initial start-up after a machine has been shut down and the tracks 20D are far outside the precision position sensing range. The controller programs are pre-loaded with the necessary physical parameters to enable the appropriate corrective action for different degrees of misalignment. The auxiliary bar patterns are easily identified, and the spacing between the tracks 20D in the belt is known. Hence the controller can immediately apply corrective action to bring the belt into range where the encoded information indicating absolute photoreceptor belt position in the process direction can be captured for precision guidance. Controller 200 uses signals from both sensors 204 at the edges 20F of the belt section 20IB to precisely determine the position of the belt section 20IB. It will be understood by those in the precision motion-feedback art, that proportional signal strength techniques may be employed within a narrow operating band at the optimal position in the cross-process direction in order to provide very close position control. The pair of belt position sensors, similar to sensors 204, at each support platen 32A–32D, are used substantially as described above to independently determine both the process and cross-process positions of the belt section at each of the support platens 32A–32D, and hence, at each of the imagers 14A–14D.

Figure 5A:
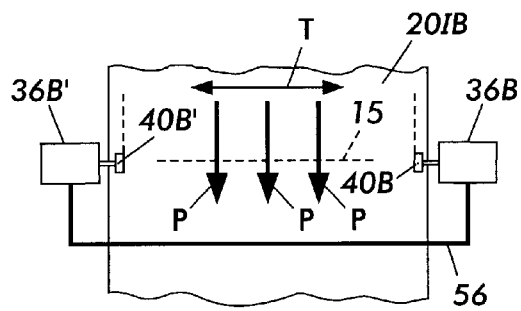
FIGS. 5A–5C are three schematic plan views of a portion of the photoreceptor belt, and guidance mechanism respectively showing the belt portion and guidance mechanism in three different configurations.
Figure 5B:
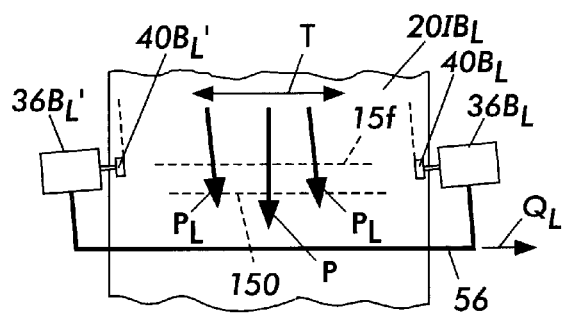
Figure 5C:
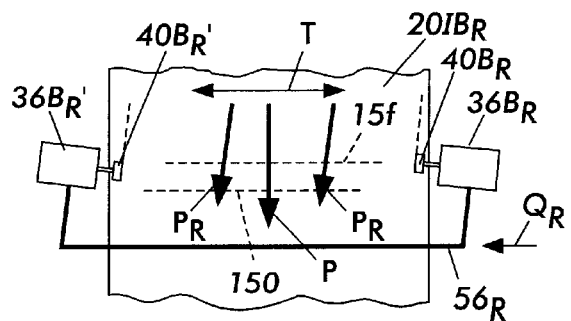

As noted before, when the image transfer apparatus 10 is operating and the imager 14B is scanning, the sensors 205, 206, (see FIG. 4) which may be suitable photocells respectively detect laser beam 13 when it reaches SOS and EOS positions and signals this information to the controller 200. The controller may then correlate the SOS and EOS positions of the beam with the detected position of the belt section 20IB being imaged by imager 14B. If the SOS/EOS of the beam occur at such a time that the laser beam is scanning an undesired position on belt section 20IB, the controller 200 sends a suitable command to steering unit 58 to steer the capstan and move the belt section so that the laser scan line 15 is properly positioned on the belt section. FIGS. 5A–5C respectively are plan views showing the belt section 20IB in three different positions. In FIG. 5A, the belt section 20Ib is in its optimal position, both in the process direction P and in the cross-process direction T. Scan line 15 formed by laser beam 13 of imager 14B strikes the desired location on the belt section 20IB. Hence, controller 200 operates capstans 36B, 36B' to move belt section 20IB true to the nominal process direction indicated by arrow P. The local direction of movement of belt section 20IB generated by capstan assemblies 36B, 36B' is indicated by arrows p. In FIG. 5A, the direction of movement of belt section 20IB is generally parallel to process direction P.

FIG. 5B depicts a second position of the belt section 20IB$_L$ (the $_L$ is used as an identifier for this position). In FIG. 5B, the scan line is initially in an undesired position. Scan line 15$_O$, indicates the original position of the scan line on belt section 20IB$_L$. In the position shown in FIG. 5B, the belt section 20IB$_L$ may be somewhat to the left initially from the desired position relative to the scan line. Conversely, the scan line 15$_O$ may be initially located somewhat to the right from the desired location. The improper initial location of the scan line 15$_O$ on belt section 20IB$_L$ may also be caused by skew in the imager 14B. Controller 200 may register the improper position of the belt section, as described previously, using belt position sensors 204. Controller 200 also registers the location of the scan line 15$_O$ using the SOS/EOS sensors 205, 206 in combination with the belt position sensors 204. The controller 200 may then, in accordance with its programming, generate an appropriate command for steering unit 58 in order to move belt section 20IB$_L$ so that, the scan line 15$_F$ (i.e. the final position of the scan line) is in the desired position on belt section 20IB$_L$. By way of example, and also with reference to FIGS. 3–4, controller 200 commands the steering unit to rotate shaft 59 an appropriate amount clockwise. The clockwise motion of the shaft 59 effects movement to the right (as indicated by arrow Q$_L$ in FIG. 5B) of the tie member 56. Consequently, the capstan assemblies 36B$_L$, 36B'$_L$ are also rotated about their respective hinges to reorient the capstan wheels $40B_L$, $40B'_L$ counterclockwise. This causes the belt section $20IB_L$ to locally move both forwards, and to the left as indicated by arrows $p_L$ in FIG. 5B. The belt section $20IB_L$ continues to move in this direction until the controller 200 registers that the scan line $15_f$ is in the desired location on the belt. At that time, the controller sends a command to the steering unit 58, returning the capstan assemblies $36B_L$, $36B'_L$ to a neutral configuration (as shown in FIG. 5A).

FIG. 5C, shows the reciprocal case where the belt section $20IB_R$ is initially shifted to the right from the desired position, and/or the scan line $15_0$ is originally shifted to the left (the $_R$ is used as an identified for this position), The controller 200 detects this and in a manner substantially similar, but opposite to that described above, moves the belt section $20IB_R$ using capstan assemblies $36B_R$, $36B'_R$, to the left of the process direction P as indicated by arrows $p_R$. For example, in this case, the controller 200 operates the steering unit to move tie members $56_R$ to the left as indicated by arrow $Q_R$. The capstan wheels $40B_R$, $40B'_R$ are hence pointed to the left. The tangential movement (indicated by arrows $p_R$) of belt section $20IB_R$ caused by steering the capstan wheels $40B_R$ $40B'_R$ produces 1.0 mm of lateral belt translation (relative to the nominal process direction indicated by arrow P) in 2¼ inch of belt travel in process direction P, for a 1° change in steering angle. Decoupling loops 20S (see also FIG. 2) on either side of the platen/capstan assemblies allow movement of the belt section 20IB without interfering with the belt sections on other platen/capstan assemblies. In the preferred embodiment, position feedback is proportional, such that errors in the photoreceptor belt 20 at one of the platen/capstan assemblies decay exponentially as the belt proceeds in the general process direction P. Hence, if an initial 1 mm misalignment, either to the left, or right, of belt section 20IB resulted in a 1° change in steering angle through the corrective action of the controller 200, the misalignment would decay to about a 1 micron residual error in the belt 20 after a belt travel of about 16 inches. This is to be compared with conventional systems employing steering rollers which rarely stabilize in less than several complete belt rotations. Movement and error correction of the belt sections at the platen/capstan assemblies is thus both efficient and substantially independent.

Figure 6:
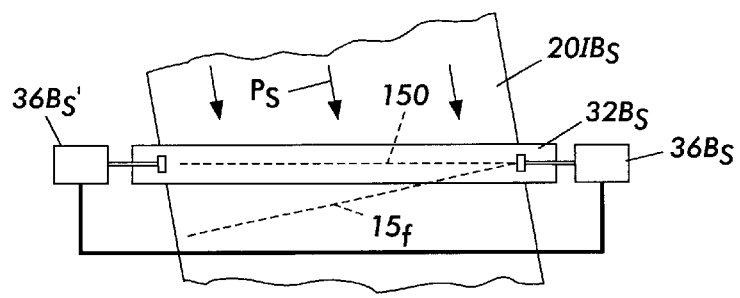
FIG. 6 is another schematic plan view showing still another configuration of the photoreceptor belt and guidance mechanism.

FIG. 6 is still another plan view of the belt section $20IB_S$ at one of the platens $32B_S$. FIG. 6 depicts the case where the scan line $15_0$ is originally skewed on the belt section $20IB_S$ ($_S$ is used as the identifier for this position). Belt section $20IB_S$ may also be skewed with respect to the scan line. Controller 200 registers the improper position of the scan line $15_0$ by comparing the indications from the SOS/EOS sensors 205, 206 with the absolute in process belt location indications from the belt position sensors 204 at each edge of the belt $20IB_S$ (see FIG. 4). In response to indications that the scan line $15_0$ is skewed relative to the belt section $20IB_S$, the controller 200 commands the capstan assemblies $36B_S$, $36B'_S$ to rotate at different speeds which causes the belt section $20IB_S$ to skew as indicated by arrows $p_S$. By way of example, if the scan line $15_0$ is skewed counter-clockwise on the belt section, capstan assembly $36B'_S$ may then be rotated at a higher speed than the capstan assembly $36B_S$ causing belt section $20IB_S$ to skew counter-clockwise thereby righting the scan line $15_F$ on the belt section (see FIG. 6). The condition depicted in FIG. 6 may occur in combination with one of the conditions shown in FIGS. 5B–5C. In that case, the controller 200 may correct the placement of the scan line on the belt section by steering with the capstan assemblies (as described previously in reference to FIGS. 5B–5C) in combination with having the capstan wheels rotate at different speeds (as described above in reference to FIG. 6). The controller of the apparatus adjusts each portion of the belt at each of the imagers 14A–14D independently using the corresponding capstan assemblies in a manner substantially similar to that described above. This results in an accurate placement of each latent image generated by each imager on the belt.

The present invention provides an image transfer apparatus with an image transfer belt transport system which propels, and steers the belt to insure accurate placement of an image on the belt. The steering system of the present invention provides for substantially instantaneous correction of the image being formed on the image transfer belt.

It should be understood that the foregoing description is only illustrative of the invention. Various alternatives and modifications can be devised by those skilled in the art without departing from the invention. For example, the belt transport system of the present invention may be used substantially as described previously, on a photoreceptor belt(as in the preferred embodiment), on an intermediate image transfer belt, an ionographic electroreceptor web, inkjet receiver, or on any other sheet and flat ribbon media wherein alignment of the media is controlled. Accordingly, the present invention is intended to embrace all such alternatives, modifications and variances which fall within the scope of the appended claims. different speeds (as described above in reference to FIG. 6). The controller of the apparatus adjusts each portion of the belt at each of the imagers 14A–14D independently using the corresponding capstan assemblies in a manner substantially similar to that described above. This results in an accurate placement of each latent image generated by each imager on the belt.

The present invention provides an image transfer apparatus with an image transfer belt transport system which propels, and steers the belt to insure accurate placement of an image on the belt. The steering system of the present invention provides for substantially instantaneous correction of the image being formed on the image transfer belt.

It should be understood that the foregoing description is only illustrative of the invention. Various alternatives and modifications can be devised by those skilled in the art without departing from the invention. For example, the belt transport system of the present invention may be used substantially as described previously, on a photoreceptor belt(as in the preferred embodiment), on an intermediate image transfer belt, an ionographic electroreceptor web, inkjet receiver, or on any other sheet and flat ribbon media wherein alignment of the media is controlled. Accordingly, the present invention is intended to embrace all such alternatives, modifications and variances which fall within the scope of the appended claims.

What is claimed is:

1. A transport system for transporting sheet media in an image transfer apparatus, the transport system comprising:
   a drive section; and
   at least one wheel drivingly connected to the drive section, the at least one wheel being disposed to contact the sheet media for transporting the sheet media generally in a process direction in the image transfer apparatus when the at least one wheel is driven by the drive section;
   wherein, the at least one wheel is hinged so that the at least one wheel is steerable for orienting the at least one wheel in a predetermined direction and for controlling a direction of travel of the sheet media relative to the process direction.

2. A transport system in accordance with claim 1, wherein the sheet media is a photoreceptor media formed into a closed loop belt.

3. A transport system in accordance with claim 1, wherein the image transfer apparatus is an image on image, electrophotographic image forming apparatus.

4. A transport system in accordance with claim 1, wherein the transport system comprises another wheel in contact with the sheet media, the at least one wheel and the other wheel forming a pair of wheels, each wheel contacting the sheet media at opposite marginal edges of the sheet media.

5. A transport system in accordance with claim 4, wherein the other wheel is drivingly connected to the drive section and is generally aligned with the at least one wheel in a direction transverse to the process direction.

6. A transport system in accordance with claim 4, wherein the pair of wheels are coupled together to steer the sheet media in unison.

7. A transport system in accordance with claim 4, wherein the drive section includes at least two drive motors, and wherein each wheel of the pair of wheels is drivingly connected to a corresponding one of the two drive motors for rotating the wheel and transporting the sheet media.

8. A transport system in accordance with claim 1, wherein the drive section comprises a drive motor drivingly connected by a shaft to the at least one wheel, the drive motor being pivotably mounted to a frame of the image transfer apparatus to pivot about an axis of rotation, and wherein the at least one wheel is steered by pivoting the drive motor relative to the frame.

9. A transport system in accordance with claim 8, wherein the at least one wheel has a pivot axis about which the at least one wheel is pivoted when being steered, the pivot axis of the at least one wheel generally coinciding with the axis of rotation about which the drive motor is pivoted.

10. A transport system in accordance with claim 8, further comprising a steering mechanism connected to the drive section for pivoting the drive motor about the axis of rotation and steering the at least one wheel, the steering mechanism comprising:
a control arm fixedly connected at one end to the drive motor; and
a steering input device connected to an opposite end of the control arm, the steering input device being adapted for receiving an electronic steering command and converting the electronic steering command into a mechanical steering input to the control arm.

11. A transport system in accordance with claim 10, further comprising sensors for detecting a position of the sheet media in the process direction and an orientation of the sheet media relative to the process direction, the sensors sending to an electronic processor of the image transfer apparatus an electronic signal corresponding to the detected position and orientation of the sheet media for generating the electronic steering command for the steering input device.

12. A transport system in accordance with claim 10, further comprising sensors for detecting a position relative to the sheet media of an imaging beam directed at the sheet media, the sensors sending to an electronic processor of the image transfer apparatus an electronic signal corresponding to the detected position of the imaging beam relative to the sheet media for generating the electronic steering command for the steering input device.

13. A transport system in accordance with claim 1, wherein the at least one wheel is located at an imaging station of the image transfer apparatus.

14. A transport system in accordance with claim 1, further comprising a bias member biasing the sheet media against the at least one wheel, the bias member comprising at least one of an air bearing, or a spring loaded roller, disposed opposite the at least one wheel.

15. A transport system for transporting sheet media in an image transfer apparatus, the transport system comprising:
a drive section; and
at least one wheel drivingly connected to the drive section, the at least one wheel being disposed to contact the sheet media for transporting the sheet media generally in a process direction in the image transfer apparatus when the at least one wheel is driven by the drive section;
wherein, the at least one wheel is steerable for orienting the at least one wheel in a predetermined direction and for controlling a direction of travel of th e sheet media relative to the process direction, and wherein the at least one wheel makes contact with a side of the sheet media having a photosensitive surface disposed thereon.

16. An image transfer apparatus comprising:
a frame;
at least one imager supported by the frame for generating an image on a photoreceptor media;
an image process station supported by the frame for processing the image on the photoreceptor media; and
a transport system mounted to the frame for transporting the photoreceptor media in a process direction between the imager and the image process station, the transport system being adapted for forming a slack section in the photoreceptor media between the imager and the image process station;
wherein the transport system comprises a pair of wheels which contact the photoreceptor media at the imager and transport the photoreceptor media when the pair of wheels are rotating about an axis of rotation of the wheels, each of the transport wheels being pivotably mounted to the frame so t hat each transport wheel is pivotable relative to the frame about a corresponding pivot axis, the pair of transport wheels being pivoted relative to the frame for translating the photoreceptor media at one end of the slack section in a direction transverse to the process direction.

17. An image transfer apparatus in accordance with claim 16, wherein the pair of wheels contact the photoreceptor media at one end of the slack section of the photoreceptor media, said end of the slack section being located at the imager, and wherein the transport system comprises a photoreceptor media transport mechanism at the image process station for transporting an opposite end of the slack section of the photoreceptor media located at the image process station.

18. An image transfer apparatus in accordance with claim 16, wherein the image process station is a image developing station for developing the image formed on the photoreceptor media by the imager.

19. An image transfer apparatus in accordance with claim 16, wherein the transport system comprises a drive section with motors connected to the pair of wheels for independently rotating each one of the pair of wheels about the axis of rotation.

20. An image transfer apparatus in accordance with claim 16, wherein the pair of wheels are coupled to each other to be pivoted in substantial unison about the corresponding pivot axis.

21. An image transfer apparatus in accordance with claim 16, wherein the photoreceptive media is disposed in a closed loop belt having one side with a photoreceptive surface thereon, and wherein the pair of wheels contact an opposite side of the belt from the side having the photoreceptive surface thereon.

22. An image transfer apparatus in accordance with claim 16, the image transfer apparatus further comprises a photoreceptor media support member connected to the frame for supporting the photoreceptor media against the pair of wheels of the transport system, wherein the support member includes an air bearing biasing the photoreceptor media against the pair of wheels.

23. An image transfer apparatus in accordance with claim 16, further comprising another imager supported by the frame, the other imager being disposed in tandem with the at least one imager in the process direction, and the image processing station being located therebetween.

24. An image transfer apparatus in accordance with claim 16, wherein the transport system is adapted for forming another slack section in the photoreceptor media so that the photoreceptor media has at least two slack section located in the process direction on either side of the pair of wheels.

25. An electro-photographic image transfer apparatus comprising:
a frame;
at least one imager connected to the frame for forming a latent image on a photoreceptor media;
at least one developer connected to the frame for developing the image on the photoreceptor media;
at least one fuser connected to the frame for transferring the image on the photoreceptor media to a final media; and
a transport system mounted to the frame for transporting the photoreceptor media in a process direction to at least one of the imager, the developer, or the fuser, wherein the transport system comprises a pair of capstan wheels which move the photoreceptor media in the process direction when the capstan wheels are rotated about an axis of rotation, each wheel of the pair of capstan wheels being pivotably mounted to the frame so that each capstan wheel is pivotable about a corresponding pivot axis relative to the frame.

26. An electro-photographic image transfer apparatus in accordance with claim 25, wherein the pair of wheels are coupled to each other so that the pair of wheels pivot substantially in unison, the pair of wheels being pivoted relative to the frame to point the pair of wheels in another direction defining a non-zero angle with the process direction, and transport at least a portion of the photoreceptor media in the other direction.

27. A method for forming an image with an electro-photographic image transfer apparatus, the method comprising the steps of:
providing the image transfer apparatus with an imager for forming an image on a photoreceptor belt;
providing the image transfer apparatus with a transport system for moving the photoreceptor belt in a process direction past the imager, the transport system being provided with at least one pair of wheels upon which moves the photoreceptor belt, each wheel of the pair of wheels being hinged to pivot about a corresponding pivot axis relative to the process direction; and
pivoting the pair of wheels relative to the process direction to reposition at least a portion of the photoreceptor belt in a direction transverse to the process direction.

28. A method in accordance with claim 27, further comprising the step of providing the transport system with drive motors for driving the pair of wheels of the transport system, and -providing a steering system for steering the pair of wheels substantially in unison.

* * * * *